United States Patent [19]

Wu

[11] 4,212,836
[45] Jul. 15, 1980

[54] METHOD OF FORMING THIN THERMOPLASTIC ELEMENTS OF COMPLEX CURVATURE

[75] Inventor: Shy-Hsien Wu, Horseheads, N.Y.

[73] Assignee: Corning Glass Works, Corning, N.Y.

[21] Appl. No.: 938,871

[22] Filed: Sep. 5, 1978

[51] Int. Cl.$^2$ .............................................. B29D 11/00
[52] U.S. Cl. ........................................ 264/1; 264/225; 264/316; 264/320
[58] Field of Search ................... 264/1, 2, 316, 320, 264/322, 225; 425/808

[56] References Cited

U.S. PATENT DOCUMENTS

| | | | |
|---|---|---|---|
| 2,644,985 | 7/1953 | Crandon | 264/1 |
| 2,990,574 | 7/1961 | De Carle | 425/808 |
| 3,240,854 | 3/1966 | Ewer | 264/1 |
| 3,422,168 | 1/1969 | Bowser | 425/808 |
| 3,542,907 | 11/1970 | Wichterle | 264/1 |
| 3,594,457 | 7/1971 | Wright | 264/1 |
| 3,662,041 | 5/1972 | Hartman | 264/1 |
| 4,038,014 | 7/1977 | Dusza et al. | 425/808 |

*Primary Examiner*—James B. Lowe
*Attorney, Agent, or Firm*—Kees van der Sterre; Clinton S. Janes, Jr.

[57] ABSTRACT

Thin thermoplastic film is reformed to provide matching elements for surfaces of complex curvature, such as the surfaces of compound or aspheric glass lenses. The film is hot-pressed between the curved surface to be matched and a pressing piece of similar curvature, formed by casting a low-melting-point alloy against the curved surface to be matched.

4 Claims, No Drawings

METHOD OF FORMING THIN THERMOPLASTIC ELEMENTS OF COMPLEX CURVATURE

BACKGROUND OF THE INVENTION

The present invention is in the field of glass-plastic composites and particularly relates to the manufacture of curved plastic elements for laminated glass-plastic lenses.

Glass-plastic lenses have been a subject of research because they combine the chemical durability of glass with the toughness, lightweight and tintability of plastics. An early example of such a composite is the laminated glass-plastic lens described by Rogers in U.S. Pat. No. 2,263,249, which combines a glass lens element with a curved plastic element composed of a light-polarizing polyvinyl alcohol plastic sheet, providing a durable polarizing lens. More recent examples of laminated glass-plastic lenses include the glass-plastic safety lens described by French et al. in U.S. Pat. No. 3,867,235, consisting of a conventional glass lens backed by a clear, tough, polymeric film.

A number of tough, optically clear thermoplastic films have been considered for composite fabrication, including, for example, cellulosic, polycarbonate, acrylic, polyvinyl alcohol and ionomer films. However, it appears that good optical performance in a laminated lens requires close curvature matching between glass and plastic elements. This matching is aided if preformed curved plastic elements are used in lamination.

Vacuum reforming processes have been used to reform relatively thick flat film, e.g., 30-mil thick cellulose acetate butyrate, into approximately spherically curved plastic elements for sunglass lenses and the like, but such processing is not adaptable to the reforming of thin ($\leqq$ 15-mil thick) thermoplastic films. Moreover, curvatures obtained by vacuum reforming are not precise, and the optical quality of such elements has not been high. Finally, such techniques have not been extended to the production of curved non-spherical elements.

It is difficult to generate reforming surfaces sufficiently closely matched to non-spherically curved glass elements to reform plastic elements into curved elements which match those glass elements in curvature. Attempts to conform thermoplastic films to non-spherical curved surfaces using a pair of non-rigid (e.g., elastic) reforming members have not been successful. At the rather high pressures needed to achieve complete curvature conformity with some of the tougher films, elastic reforming members produce flow marks in the thermoplastic film which destroy optical quality.

It is a principal object of the present invention to provide a method for reforming thermoplastic film to provide curved plastic elements which substantially match the curvature of essentially any curved surface, but particularly surfaces of compound or aspheric curvature.

It is a further object of the invention to provide a method for reforming thermoplastic film to precise complex curvature which does not adversely affect the optical quality of the film.

Other objects and advantages of the invention will become apparent from the following description thereof.

SUMMARY OF THE INVENTION

In accordance with the invention, thin curved plastic elements are provided which closely match in curvature essentially any selected curved surface. These elements are produced by a reforming process wherein the film is hot-pressed between the surface to be matched and a rigid pressing element formed of a low-melting-point alloy. The rigid pressing element is formed by casting or molding the low-melting-point alloy against the surface to be matched, thus conforming the alloy element to that surface.

Briefly, the reforming method of the present invention comprises the initial step of making a rigid pressing piece having a curved pressing surface substantially conforming to the curvature of a rigid, curved surface to be matched, by molding a low-melting-point alloy against the rigid curved surface to be matched and then solidifying the alloy by cooling it to room temperature. The alloy may be molded directly against the particular surface to be matched, or against protective or spacing layers provided thereon.

After the rigid pressing piece with an appropriately curved pressing surface has been formed, it is provided with a smooth, thin elastic covering layer. This layer improves the surface quality of the curved pressing surface without affecting the curvature thereof, so that the pressing surface does not have to be finished to remove surface defects.

Finally, thin thermoplastic films are reformed into curved plastic elements by hot-pressing the film between the covered pressing surface and the rigid curved surface to be matched by heating the film to a temperature effective to permanently conform it to the pressing surfaces. This film is then cooled, preferably to room temperature while still in contact with the pressing surfaces, and then separated therefrom.

Because the curved pressing surface is closely matched in curvature to the rigid, curved surface to be matched, a plastic element having a curvature which exactly conforms to that surface may be provided. Also, because the elastic covering layer is thin and is backed by the rigid pressing surface, and because the surface are sufficiently closely matched in curvature so that high reforming pressures are not needed, flow marks due to deformation of the layer are avoided. Thus the present method has no adverse effects on the optical quality of the film to be reformed.

While the reforming method described may be used to provide plastic elements conforming to essentially any curved surface, including surfaces of simple cylindrical or spherical curvature, it is particularly useful for providing matched plastic elements for surfaces of complex curvature. Thus plastic elements exactly conforming to aspheric surfaces or to surfaces of compound curvature (ophthalmic lens surfaces having sphere plus cylinder) may readily be provided, and the problem of attempting to produce pressing surfaces of complex curvature by machining or other techniques may be completely avoided. As additional advantages, the process of forming the alloy pressing piece is rapid and the alloy material can be re-used indefinitely to make pressing pieces of different curvatures.

DETAILED DESCRIPTION

A major application for the method of the invention is in the manufacture of preformed curved plastic elements for glass-plastic lenses. Such lenses can comprise glass elements of complex curvature, specifically prescription elements comprising both sphere and cylinder in a single surface. Other lenses are low-cost sagged glass elements for sunglasses or the like, which may be aspheric in curvature. The manufacture of high quality optical composites from such elements requires preformed plastic elements of precisely matching curvature.

The effectiveness of the method of the present invention in providing such elements results from the desirable reforming characteristics of the combination of a rigid metallic reforming piece with a thin elastic covering layer. The rigid metal piece can be readily shaped by molding to match any irregular curvature, but is not optically smooth, due to the presence of oxide traces and tiny voids in the surface of the molded metal. The thin elastic covering layer provided on the rigid pressing piece imparts the necessary optically smooth surface thereto.

Among the optically clear, tough thermoplastic films considered useful for the fabrication of glass-plastic composite lenses are films composed of cellulosic, polycarbonate, acrylic, polyvinyl alcohol or ionomer resins. Films composed of these resins and having a thickness within the range considered useful for the fabrication of composite lenses (about 5–40 mils) are commerically available. Preferably, the film selected for reforming will be of optical quality, i.e., free of streaks, dimples and other surface defects which can introduce distortion into a lens.

Temperatures suitable for reforming tough optically clear thermoplastic films of the above types typically lie within the range of about 200°–350° F. A number of alloys which are solid at one or more temperatures within this range, but which melt at temperatures in the range of about 250°–475° F. are known, including, for example, certain of the lead-tin soldering alloys having melting points in the range of about 360°–380° F.

Any of the conventional alloy casting techniques can be used for form the rigid pressing piece against the curved surface to be matched. For example, a casting mold can be formed using the curved surface as the mold bottom, and a heat-resistant gasketing material may be used to form a mold wall around the periphery of the curved surface. The molten alloy is then simply poured into the leveled mold assembly thus provided. Preheating of the mold assembly to approximately the temperature of the molten alloy may be desirable to prevent premature alloy solidification, or to minimize thermal shock stresses if the mold assembly includes a glass bottom element.

The reforming of the thermoplastic film is preferably carried out at a temperature above the glass transition temperature of the thermoplastic, so that shaping can be accomplished at minimum pressure. For the purpose of the present description, the glass transition temperature of a thermoplastic is that temperature at which the thermoplastic changes to (or from) a viscous or yielding condition from (or to) a rigid, relatively brittle one. The glass transition temperature of a thermoplastic may be measured according to procedures described in the 1977 Annual Book of ASTM Standards, Part 35, Designation D3418-75. Temperatures within the range of about 220°–300° F. are normally sufficient for reforming tough optically clear thermoplastic films of the types hereinabove described.

For best curvature matching, it is preferred that, after reforming, the reformed film be cooled while still in contact with the reforming surfaces. Cooling should be to a temperature below the glass transition temperature or, more preferably, to room temperature. For this purpose it is often convenient to remove from the hot-pressing apparatus, as a unit, the rigid pressing piece, the elastic covering layer the reformed thermoplastic film, and the curved matching surface, to implement rapid cooling and separation of the film from the reforming surfaces.

The invention may be further understood by reference to the following detailed examples illustrating the manufacture of curved optically clear plastic elements in accordance therewith.

EXAMPLE 1

A glass meniscus lens of a type suitable for ophthalmic use, having a diameter of 70 mm, a $6\frac{1}{4}$-diopter spherical curvature, and a cylinder correction of $-3$ power superimposed on the back lens surface, is selected for composite fabrication. A 10-mil thick back-surface polycarbonate plastic film of compound curvature is to be provided for this lens. This film is commercially available as Lexan ® polycarbonate film from the General Electric Co., Pittsfield, Massachusetts.

To reform 10-mil polycarbonate film, a rigid alloy pressing piece is cast in a casting chamber wherein the chamber base is formed by the concave surface of the glass meniscus lens. The edge of the lens is wrapped with a strip of 5-mil aluminum foil to provide a mold sidewall extending about one inch upward from the concave lens surface, and this sidewall is then reinforced with a strip of stainless steel, a covering strip of 60-mil thick silicone rubber, and a flexible stainless steel hose clamp. The lens then is leveled in the sidewall assembly using a quantity of acetone as a leveling indicator.

The interior of this casting chamber assembly is cleaned with acetone and the assembly is then heated on a hot plate to a temperature of about 400° F. Meanwhile, a molten lead-tin alloy, commercially available as V63 solder from Alpha Metals, Inc. of Jersey City, New Jersey, is melted in a separate beaker at a temperature of about 420° F. This alloy consists of about 63% tin and 37% lead by weight, and has a melting point of about 361° F.

The molten solder is poured into the casting chamber to a depth of about $\frac{1}{2}$", and the casting chamber is then gently vibrated to release any air bubbles trapped within the liquid metal. The casting is then allowed to cool in the chamber to room temperature over an interval of about one hour, whereupon the mold sidewall strips are removed and reference points for orientation of the cast pressing piece with the lens are marked on the lens and on the casting. The top of the casting is sanded with coarse sandpaper to insure flatness for later pressing.

A reforming assembly for reforming the 10-mil polycarbonate plastic film is then built up on the bottom platen of a hot pressing machine. A 6-diopter concave stainless steel mold is positioned on the bottom platen, followed by a 60-mil sheet of silicone rubber, the 70-millimeter ophthalmic lens, a 70-millimeter circular piece of polycarbonate plastic film cut from a larger 10-mil sheet of the plastic, a sheet of 30-mil thick silicone rubber, the cast alloy pressing piece, and a steel top weight for contacting the upper platen of the hot pressing machine. The orientation marks on the cast pressing piece and lens are precisely aligned prior to pressing.

In order to reform the plastic film, a hot pressing cycle is used which comprises first heating the lens assembly to a temperature of 300° F., maintaining the assembly at this temperature under contact pressure (about 1 psi) for about 3 minutes, thereafter increasing the pressure to 280 psi, and maintaining this pressure for about 10 minutes.

After this pressing cycle has been completed, the lens, polycarbonate film, silicone rubber sheet, and alloy pressing piece are removed from the hot press and cooled to room temperature with compressed air. The alloy pressing piece and silicone rubber are then separated from the polycarbonate film and glass, and the glass and film are placed in an ultrasonic bath for a few seconds to facilitate separation. Examination of the reformed plastic piece produced by this process indicates that the plastic precisely matches the compound curvature of the concave surface of the lens, and that no new distortion attributable to the reforming process has been introduced into the plastic film. Thus the curved plastic piece may be bonded to the glass lens without the introduction of optical distortion into the composite.

EXAMPLE 2

To demonstrate the effectiveness of the method of the present invention in reforming thermoplastic film without the introduction of optical distortion, the procedure described in Example 1 is repeated using a polycarbonate film starting element of ophthalmic quality, which is completely free of streaks or dimple defects such as are found in polycarbonate film of ordinary commercial grade. This starting film is a defect-free, spherically curved (6¼ diopter) section of 5-mil Lexan ® polycarbonate film.

Reforming conditions useful for reforming this film into a curved element of complex curvature (sphere plus cylinder), employing the reforming apparatus described in Example 1 above, comprise heating the film under contact pressure (about 1 psi) for 10 minutes at 270° F. After reforming, cooling, and separation of the film from the reforming surfaces, it is found that a plastic element of ophthalmic quality, precisely matching the complex curvature of the reforming lens surface, has been provided without introducing any optical distortion into the element during reforming.

EXAMPLE 3

The procedure described in Example 1 is again repeated, except that a 6¼ diopter ophthalmic lens of simple spherical curvature (rather than sphere plus cylinder) is used to provide the alloy casting chamber for the casting of the alloy pressing piece, and to provide the curved surface to be matched with 10-mil polycarbonate film during reforming. Using reforming conditions identical to those employed in Example 1, a reformed 10-mil polycarbonate plastic element having a simple spherical curvature, which precisely matches the curvature of the 6¼ diopter lens, is provided. No additional optical distortion is introduced into the film by the reforming process.

EXAMPLE 4

A curved cellulose acetate butyrate plastic element is to be provided from a section of flat nitrocellulose-coated cellulose acetate butyrate sheet of ordinary commercial quality, the curved piece being designed to match the curvature of the back surface of a free-sagged glass lens of aspheric curvature. This sheet is commercially available as Kodacel ® sheet from Eastman Chemical Products, Inc., Kingsport, Tennessee. For this purpose, a rigid alloy pressing piece is formed by casting according to the procedure described in Example 1 above, except that the sagged aspheric glass lens to which the cellulose acetate butyrate is to be matched is used as the mold base.

Molten V63 lead-tin alloy solder is poured into a mold assembly wherein the concave surface of the aspheric glass lens is the mold bottom, the casting is cooled to room temperature, and the rigid casting and lens are marked for later alignment and separated. A reforming assembly is then provided by positioning a concave 6-diopter stainless steel mold on the bottom platen of the hot pressing machine of Example 1. Upon this mold are then positioned a 60-mil sheet of silicone rubber, the aspheric glass lens, a 70-millimeter circular piece of 13.5-mil-thick nitrocellulose-coated cellulose acetate butyrate sheet, a 30-mil thick sheet of silicone rubber, the cast alloy pressing piece, and a top metal weight for contact with the top platen of the press. The rigid pressing piece and sagged glass lens are again precisely aligned prior to commencement of the reforming cycle.

To reform the cellulose acetate butyrate sheet, the pressing assembly is heated to a temperature of 255° F. and maintained at that temperature under contact pressure for 30 seconds. Thereafter the pressure is increased to 140 psi and maintained at that pressure for 5 minutes, and the pressure is then further increased to 280 psi and maintained at that pressure for 10 minutes.

The pressure is then released, the glass lens, cellulose acetate butyrate, silicone rubber sheet and cast pressing piece are removed from the hot press, and these pieces are cooled to room temperature with compressed air. The pressing piece and silicone rubber sheet are then separated from the cellulose acetate butyrate and glass lens, and the curved cellulose acetate butyrate element is separated from the glass lens by a brief immersion in an ultrasonic bath.

Inspection of the reformed plastic element produced by this process indicates that a perfect curvature match between the plastic element and the aspheric glass lens has been obtained. No optical defects have been introduced into the plastic element by the reforming process; thus a laminated glass-plastic lens may be provided using this element without adding optical distortion to the laminated system.

EXAMPLE 5

A reforming assembly as described in Example 4 above is built up for the purpose of reforming a section of plastic film to match the sagged aspheric glass lens therein described. However, in place of the 13.5-mil coated cellulose acetate butyrate plastic film treated in Example 4, a 70-millimeter circular section of laminated plastic film consisting of a 0.5-mil thick sheet of polarizing polyvinyl alcohol film sandwiched between two 5-mil sheets of cellulose acetate butyrate film is inserted between the glass lens and the 30-mil silicone sheet components of the assembly. This laminated film is available as B42/10 UV plastic film from Baum Chemical Corp., Van Nuys, California.

In a reforming cycle useful for reforming this film, the temperature of the reforming assembly is raised to 250° F. and maintained at that temperature under contact pressure for about 3 minutes. Thereafter the pressure is increased to 280 psi and maintained at that pressure for 10 minutes.

The aspheric glass lens, reformed plastic sheet, silicone rubber sheet and cast pressing piece are then removed from the reforming assembly and cooled to room temperature with compressed air. The glass lens and reformed plastic element are then separated from the rubber sheet and casting piece and placed in an ultrasonic bath for a few seconds to facilitate separation.

Examination of the reformed laminated plastic element produced by this process indicates that a perfect curvature match with the aspheric glass lens has been obtained. Both the optical quality and the polarizing efficiency of the original laminated plastic sheet have been retained, so that a composite lens comprising the aspheric lens and reformed plastic element may be provided without introducing optical distortion into the laminated lens due to poor curvature matching between the glass and plastic lens components.

Of course, the foregoing examples are merely illustrative of the reforming method of the present invention; obviously numerous variations and modifications of the procedures hereinabove described may be resorted to in carrying out that method. For example, other moldable materials which can be hardened into a rigid pressing piece could be substituted for the low-melting-point alloy to provide a matched curved pressing surface for use with a glass lens. Moreover, the use of a hardenable material which could be conformed to the curvature of a lens surface without surface defects could eliminate the requirement for an elastic covering layer. Finally, the applicability of the method of the invention for the production of thin, curved plastic elements for surfaces other than lenses, and for surfaces of simple as well as complex curvature, is evident.

I claim:

1. A method for making a preformed curved plastic element for a glass-plastic lens comprising both glass and plastic elements, the glass element having a curved surface of aspheric or compound curvature and the plastic element having a curvature precisely matching the aspheric or compound curvature of said curved surface of the glass element, which comprises the steps of:
    (a) molding a low-melting-point alloy against said curved surface of the glass element to provide a rigid pressing piece having a pressing surface substantially conforming to said curved surface of said glass element;
    (b) covering the pressing surface with a smooth, thin elastic covering layer to provide a covered pressing surface; and
    (c) hot-pressing a section of thermoplastic film between said curved surface of the glass element and said covered pressing surface at a temperature sufficient to exactly conform said section of thermoplastic film to said curved surface of said glass element.

2. A method in accordance with claim 1 wherein the thermoplastic film is cooled to room temperature prior to removal from between said curved surface of said glass element and said covered pressing surface.

3. A method in accordance with claim 1 wherein the low-melting-point alloy is a lead-tin alloy.

4. A method in accordance with claim 1 wherein the thermoplastic film is selected from the group consisting of acrylic, polycarbonate, polyvinyl, alcohol, cellulosic and ionomer resin films.

* * * * *